J. A. McCASKELL.
PROCESS OF CLARIFYING SOLUTIONS.
APPLICATION FILED NOV. 4, 1919.
1,396,514.
Patented Nov. 8, 1921.
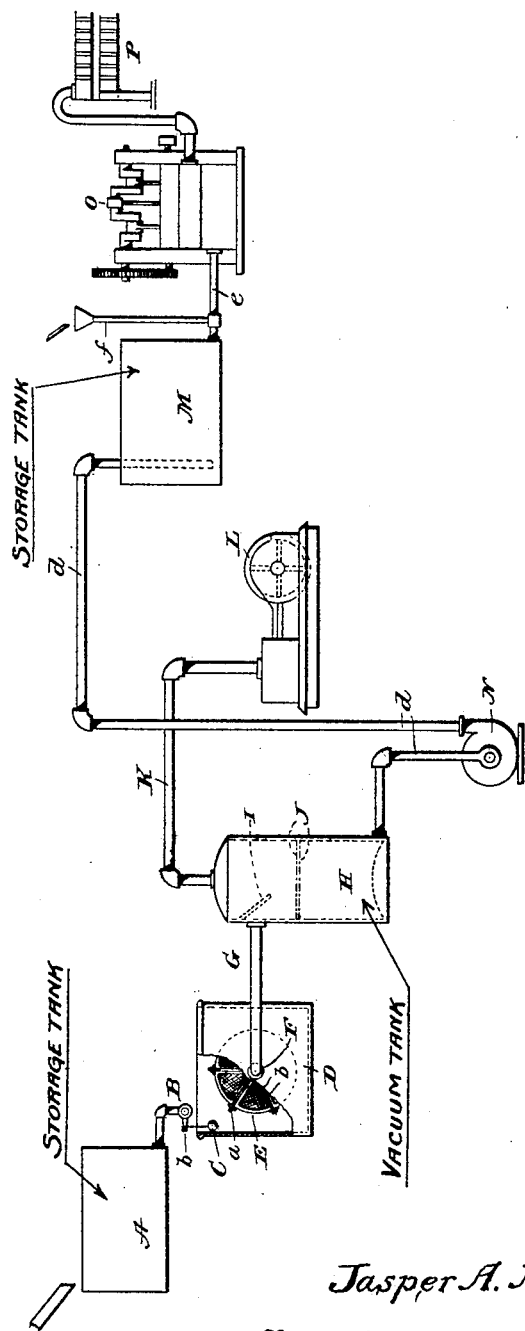
Witness:
Jas E Hutchinson
Inventor:
Jasper A. McCaskell.
By T. Walter Fowler
Attorney

UNITED STATES PATENT OFFICE.

JASPER A. McCASKELL, OF SALT LAKE CITY, UTAH.

PROCESS OF CLARIFYING SOLUTIONS.

1,396,514.    Specification of Letters Patent.    Patented Nov. 8, 1921.

Application filed November 4, 1919. Serial No. 335,698.

*To all whom it may concern:*

Be it known that I, JASPER A. McCASKELL, a citizen of the United States, residing at Salt Lake City, in the county of Salt Lake and State of Utah, have invented certain new and useful Improvements in Processes of Clarifying Solutions, of which the following is a specification.

My invention relates to a new and useful process for filtering and particularly for refiltering or clarifying the usually murky cyanid solutions resulting from the filtering steps employed in metallurgical processes for the recovery of dissolved values, and said invention consists of the steps and the succession of steps which I will hereinafter describe and point out in the appended claims.

A leading object of the present invention is to devise a process which will clarify the solutions and relieve them of suspended sedimentary matter and thus make it unnecssary to refilter such solutions in order to obtain a clear or sparkling filtrate.

In the accompanying drawing I have illustrated an apparatus which may be considered as one embodiment of mechanism which will be found useful in carrying out the process, the several parts of the apparatus being shown more or less diagrammatically.

Although the process I am about to describe will be found useful in other fields and for clarifying different solutions, I have devised it particularly for operation upon solutions which are usually employed in the cyanid process of recovering gold and silver and which solutions are usually delivered from the filter-press in a more or less murky condition.

While I have illustrated a form of clarifier which I prefer to use in connection with the present process, I do not limit my process thereto as the latter can be carried out with other forms of clarifying apparatus. I have also found that when depending upon gravity alone the capacity of the clarifier was very low as the very fine slime that is in the filtered-solution to be treated quickly clogs the pores of the filter-cloths and the filter-leaves have to be removed and cleansed.

The construction of the clarifier and the specific manner in which the sections of the individual leaves may be removed are fully shown and described in the prior Patent Number 1,293,555, dated February 14, 1919.

In the working of the process, the pregnant solution from the filter press is received into an appropriate storage tank, A, from which there is an outlet pipe with a controlling valve, B. The stem of this valve is provided with a lever, *b*, and to this is connected a float valve, C, which is designed to dip into the solution in the clarifier tank, D, said tank being supplied from the storage tank, A, and the depth of the solution in the clarifying tank being automatically maintained by means of the aforesaid float valve.

Within the clarifying tank, E', are the filter leaves, E, which are arranged side-by-side on the hollow, filtrate-conducting shaft, F, said leaves being formed of a plurality of segments each constituting a separate clarifying unit and the whole forming a circular leaf when assembled. The sections of each leaf are held in position by clamping agents, *a*, which cross the joint between adjacent sections and engage the peripheries of said sections; radial rods, *b*, extend from these clamping agents to the central shaft, as more fully disclosed in the aforesaid prior patent. This form of clarifier has been found to work most successfully in connection with my process, and as having special advantages over other types, but any desired and suitable clarifier may be used in the process without departing from the spirit of my invention or affecting the scope thereof.

The central hollow shaft, F, has an end extension or nipple leading through the side of the tank and to which is connected a pipe, G, which delivers the filtrate from the interior of the tank into a suitable vacuum chamber or receiver, H. On the inside of this chamber or receiver in line with the delivery end of the pipe, G, is a baffle or plate, I; and within the receiver below the baffle plate is arranged one or more fine screens, J, the purpose of said baffle plate and screens being to break up and more or less atomize the clarified solution entering the receiver and thus make the liberation of the contained dissolved oxygen more effective. In order that this liberated gas may be discharged from the receiver, I connect the space in the top of the receiver with a suction pipe, K, which in turn is connected to a suitable vacuum pump, L. The clarified solution in the vacuum chamber or receiver, H, may be delivered to a storage tank, M, by means of a suitable pipe line, *d*, in which is introduced a centrifugal or other pump, N, said pipe line, *d*, which conducts the discharge from the pump, N, leading to a point below the liquid level of the storage tank so as to admit the clarified solution to the bottom of the tank and thereby eliminate, as much as possible, the absorption of oxygen while the solution is in storage. If the solution is simply led to the top of the tank and allowed to flow thereinto, there would be a tendency for the solution to absorb a certain amount of oxygen, and thus eliminate the benefit derived from the removal of the same from the vacuum chamber or receiver. It will be observed that I directly connect the delivery end of the central shaft F of the clarifier with the suction end of a wet or dry vacuum pump; the latter type of pump is shown as the preferred one. By the means employed and heretofore described, I am able to greatly increase the capacity of the clarifier and this capacity may be further increased by the addition of a mixture of kieselguhr.

Another advantage due to the present method is that some of the oxygen contained in the solution is exhausted or removed by the vacuum pump and the resulting solutions are in excellent condition for the precipitation of the metals dissolved in the cyanid solution and which precipitation may be the result of the addition of zinc-dust or other precipitation agent, as I will now show. The tank, M, containing the clarified solution has an outlet pipe, e, near the bottom which connects with the inlet end of a triplex or other pump, O, the delivery end of which connects with a plate-and-frame press, P, of some approved construction. In order that the zinc-dust or other precipitating agent may be properly mixed with the solution as it leaves the tank, for delivery to the succeeding pump, I connect with the delivery pipe of the tank, M, a feed pipe, f, into the upper or hopper-end of which the zinc-dust or other precipitating agent is fed in any suitable manner. From this description it will be understood that after obtaining the clarified solution the same is sent to the storage tank, M, and the precipitation of the dissolved metals is accomplished by means of zinc-dust that is fed to the suction end of a pressure pump and is then forced into a plate-and-frame press where the precipitate is collected in a manner well known to those skilled in this art.

It will be appreciated that the process need not necessarily be confined to the filtering of cyanid solutions but that it can be used for clarifying other kinds of solution and the aforesaid steps and procedure followed; that is, by connecting the discharge pipe of the clarifier with the receiver of the vacuum pump and pumping the clarified solutions to a storage tank for further treatment, if desired.

Having thus described my invention what I claim as new and desire to secure by Letters Patent is:—

1. The process herein described of filtering solutions, which process consists, essentially, in refiltering a previously filtered solution and connecting the interior of the filtrate chamber of the refilter with a vacuum chamber; subdividing and substantially atomizing the filtrate as it enters the vacuum chamber; withdrawing from said chamber the liberated dissolved oxygen; and then delivering the refiltered solution to an open storage tank for further treatment.

2. The process herein described of filtering solutions, which process consists, essentially, in refiltering a previously filtered solution and connecting the interior of the filtrate chamber of the refilter with a vacuum chamber; subdividing and substantially atomizing the filtrate as it enters the vacuum chamber; withdrawing from said chamber the liberated dissolved oxygen; then delivering the refiltered solution to an open storage tank; and then mixing with said refiltered solution a precipitating agent for the recovery of the values in solution.

3. The process for filtering cyanid solution, said process consisting, essentially, in delivering the solution to an open tank, and automatically maintaining the depth of solution thereon; subjecting the solution to a filtering action in said tank and connecting the interior of the filtrate chamber of the tank with a vacuum chamber; atomizing the filtered solution in the vacuum chamber to liberate the dissolved oxygen in the solution; withdrawing the liberated gas from the vacuum chamber; withdrawing the filtered solution from the vacuum chamber and delivering the same to an open storage tank; mixing with the solution a precipitating agent, and delivering the mixed solution under pressure to a filter press to recover the precipitate.

In testimony whereof I affix my signature.

JASPER A. McCASKELL.